United States Patent
Chan

(10) Patent No.: US 7,317,590 B2
(45) Date of Patent: Jan. 8, 2008

(54) FLY ON DEMAND IN SITU CLEARANCE MEASUREMENT CONCEPT IN HARD DISK DRIVE

(75) Inventor: Tom Chan, San Marino, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 11/364,982

(22) Filed: Feb. 28, 2006

(65) Prior Publication Data

US 2007/0201158 A1    Aug. 30, 2007

(51) Int. Cl.
*G11B 21/02* (2006.01)
*G11B 27/36* (2006.01)
*G11B 5/09* (2006.01)

(52) U.S. Cl. .............................. 360/75; 360/31; 360/46
(58) Field of Classification Search .................... None
See application file for complete search history.

(56) References Cited

U.S. PATENT DOCUMENTS 6,975,467 B1 * 12/2005 Lewkowicz et al. .......... 360/31
2005/0185312 A1 * 8/2005 Ueda et al. ................... 360/31

FOREIGN PATENT DOCUMENTS

JP          2000195210 A   *   7/2000

* cited by examiner

*Primary Examiner*—Wayne Young
*Assistant Examiner*—Jason Olson
(74) *Attorney, Agent, or Firm*—Ben J. Yorks; Irell & Manella LLP

(57) ABSTRACT

A method for determining a flying height of a head of a hard disk drive. The disk drive includes a pre-amplifier and an automatic gain control ("AGC") circuit that are connected to the head. The method includes determining a first automatic gain control value based on AGC values at two delta pre-amplifier gain settings. A second automatic gain control value is determined based on AGC values at two different flying heights. A difference between the flying heights can be determined from the first and second automatic gain control values. If one of the flying heights is set to 0 the difference in gain values is equal to the flying height of the head.

15 Claims, 4 Drawing Sheets

FLY ON DEMAND IN SITU CLEARANCE MEASUREMENT CONCEPT IN HARD DISK DRIVE

BACKGROUND OF THE INVENTION

1. Field of the Invention

The present invention relates to a method for determining the flying height of a head of a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

The disks are rotated by a spindle motor of the drive. Rotation of the disks creates an air flow within the disk drive. Each head has an air bearing surface that cooperates with the air flow to create an air bearing between the head and the adjacent disk surface. The air bearing eliminates or minimizes the mechanical wear between the head and the disk. The height of the air bearing is commonly referred to as the flying height of the head.

The magnetic field detected by the head is inversely proportional to the flying height of the head. Likewise, the strength of the magnetic field written onto the disk is also inversely proportional to the fly height. A larger fly height will produce a weaker magnetic field on the disk.

To determine head performance it is desirable to measure the flying height of a head. The flying height can be measured with an optical based test stand. In an optical flying height tester, a head "flies" adjacent to a rotating glass substrate. A light beam is directed through the substrate, reflects off of the head and is detected by a detector. The flying height is then computed based on the detected light.

There have been developed heads that include a heater coil. Current is provided to the heater coil to generate heat and thermally expand the head to vary the flying height. These types of heads are commonly referred to as fly on demand ("FOD") heads. It is desirable to determine the flying heights of FOD heads to test and calibrate the drive. It is desirable to test FOD heads in the actual drive assembly. Optical based flying height testers can not be used to test the heads once assembled into the drive. For one thing, the substrates in the drive are not transparent to light. It would be desirable to provide a method to determine the flying height of FOD heads using the existing components of a hard disk drive.

BRIEF SUMMARY OF THE INVENTION

A method for determining a flying height of a head of a hard disk drive that has a pre-amplifier and an automatic gain control circuit. The method includes determining a first delta automatic gain control value from automatic gain control values determined at different pre-amplifier gain settings. A second delta automatic gain control value is then determined from automatic gain control values at different flying heights. A difference in flying heights can then be determined from the first and second delta automatic gain control values.

DETAILED DESCRIPTION

Disclosed is a method for determining a flying height of a head of a hard disk drive. The disk drive includes a pre-amplifier and an automatic gain control ("AGC") circuit that are connected to the head. The method includes determining a first delta automatic gain control value based on AGC values at two different pre-amplifier gain settings. A second delta automatic gain control value is determined based on AGC values at two different flying heights. A difference between the flying heights can be determined from the first and second delta automatic gain control values. If one of the flying heights is set to 0 the difference is equal to the flying height of the head. By using delta AGC values, the method eliminates any process or temperature effects on the results.

Figure 1:
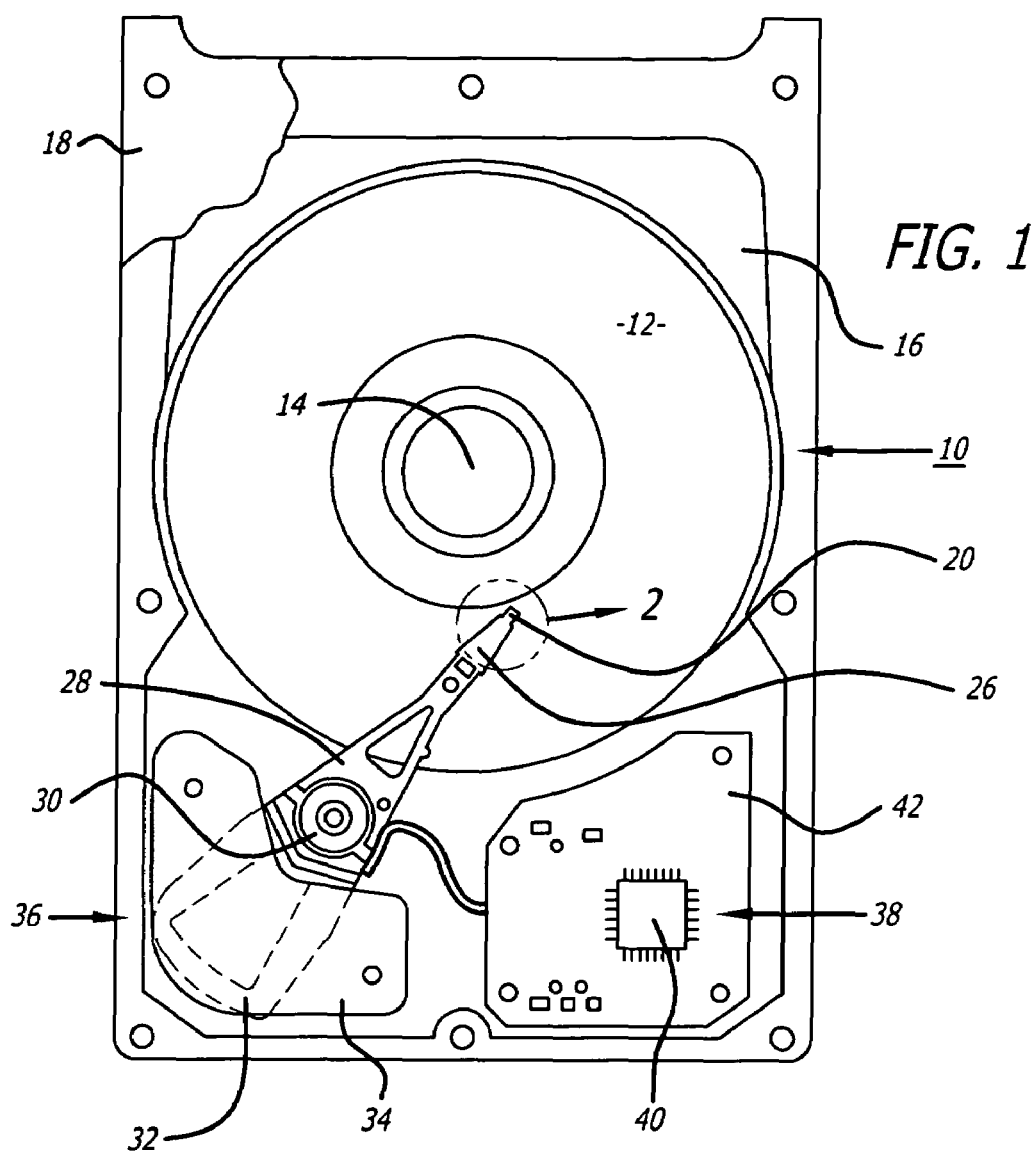
FIG. 1 is a top view of an embodiment of a hard disk drive.

Referring to the drawings more particularly by reference numbers, FIG. 1 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

Figure 2:
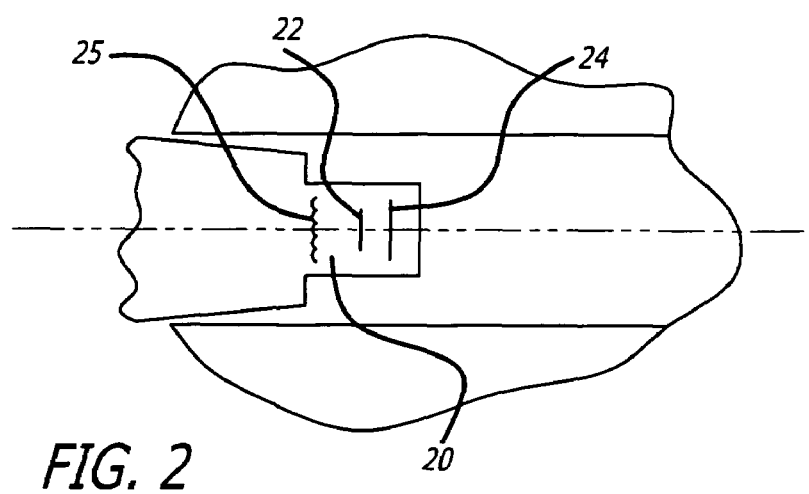
FIG. 2 is a top enlarged view of a head of the hard disk drive.

The disk drive 10 may include a plurality of heads 20 located adjacent to the disks 12. As shown in FIG. 2 the heads 20 may have separate write 24 and read elements 22. The write element 24 magnetizes the disk 12 to write data. The read element 22 senses the magnetic fields of the disks 12 to read data. By way of example, the read element 22 may be constructed from a magneto-resistive material that has a resistance which varies linearly with changes in magnetic flux. The heads also contain a heater coil 25. Current can be provided to the heater coil 25 to generate heat within the head 20. The heat thermally expands the head 20 and moves the read and write elements closer to the disk.

Referring to FIG. 1, each head 20 may be gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes one or more integrated circuits 40 coupled to a printed circuit board 42. The printed circuit board 40 is coupled to the voice coil 32, heads 20 and spindle motor 14 by wires (not shown).

Figure 3:
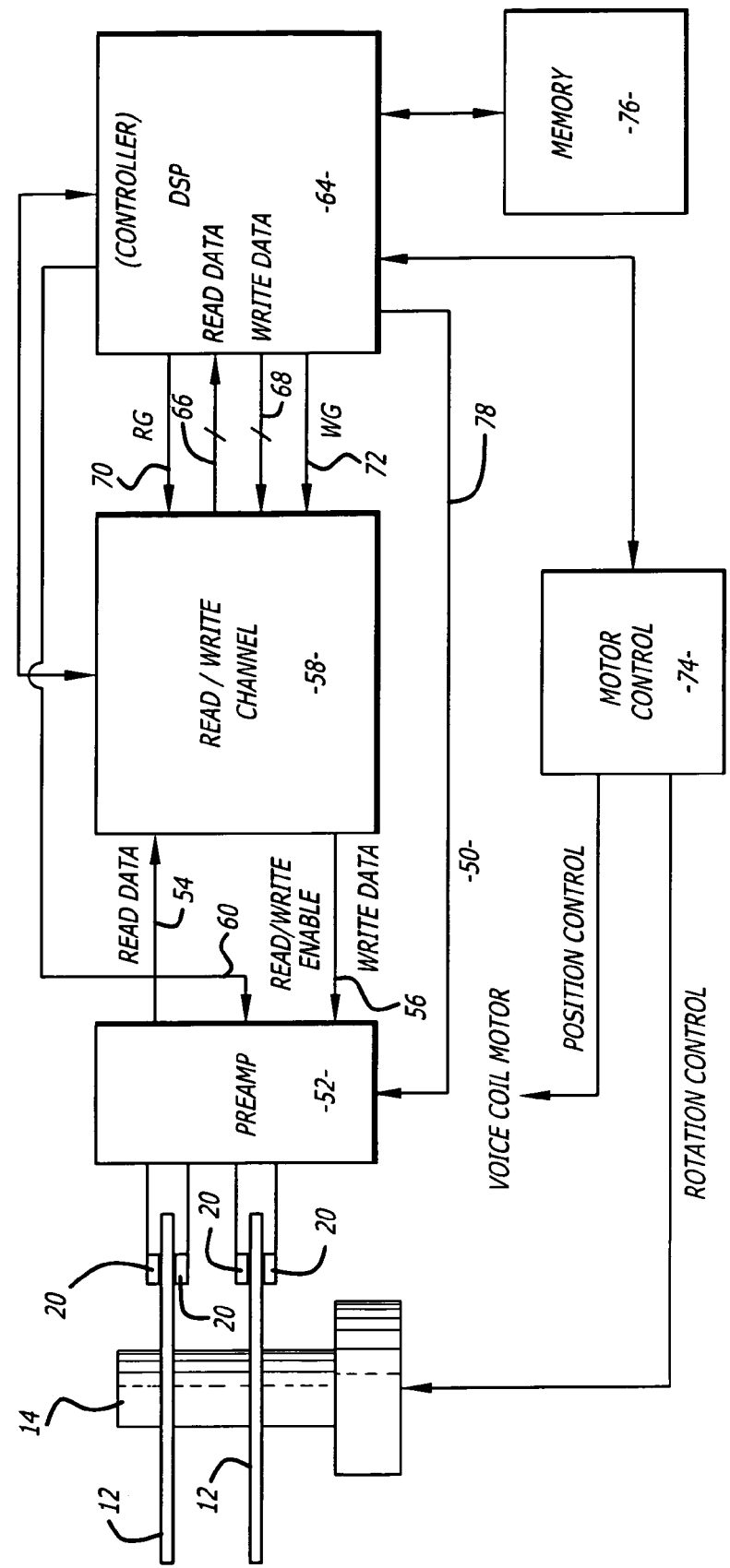
FIG. 3 is a schematic of an electrical circuit for the hard disk drive.

FIG. 3 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a software routine, including a routine(s) to write and read data from the disks 12. The read/write channel circuit 58 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM"). The non-volatile memory 76 may contain the instructions to operate the controller and disk drive. Alternatively, the controller may have embedded firmware to operate the drive.

Figure 4:
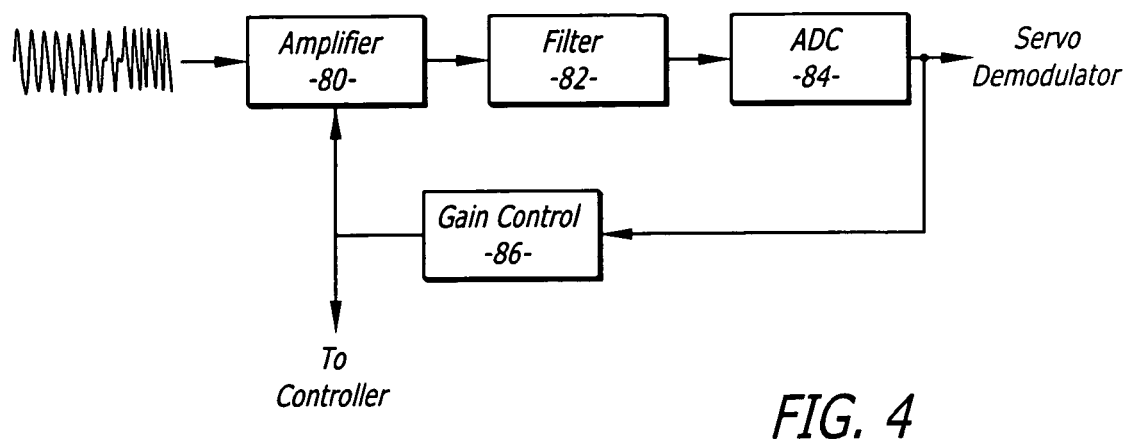
FIG. 4 is a schematic showing function blocks of a read channel of the drive.

FIG. 4 is a schematic showing functional blocks of a read channel and pre-amp of the disk drive. The read channel includes an amplifier 80 coupled to a head(s)(not shown). The amplifier 80 adjusts the amplitude of a signal read by the head. The amplified signal is filtered by filter 82 and converted to a digital bit string by an analog to digital ("ADC") converter 84.

The gain of the amplifier 80 is adjusted by an automatic gain control circuit 86. The automatic gain control circuit 86 receives as input the digital output of the ADC 84 and provides an analog control signal to the amplifier 80.

The automatic gain control signal is inversely proportional to the amplitude of the read signal. A weak signal will result in a larger control signal. A larger control signal will increase the gain of the automatic gain control circuit and boost the amplitude of the read signal. The signal read by the head is inversely proportional to the head fly height. Consequently, the control signal is proportional to the fly height. A larger control signal is indicative of an increasing fly height.

The flying height can be determined by using the AGC control signals of the gain control circuit 86. The control signals are typically stored in registers of the controller in a digital format. The difference between two flying heights Δd can be determined with the following equation:

$$\Delta d = \frac{\lambda}{2\pi} \cdot \ln(\text{cal\_gain\_ratio}) \cdot \left( \frac{\text{Delta\_AGC\_DAC}}{\text{AGC\_CAL}} \right) \quad (1)$$

Where; λ=the recording wavelength, which can be determined from the rotational speed of the disk and the location of the head on the disk. AGC_CAL =the difference between two AGC values at different pre-amplifier gain settings. cal_gain_ratio =the ratio of the different pre-amplifier gain settings. Delta_AGC_DAC =the difference between two AGC values at different flying heights.

If one of the flying heights used to determine Delta_AGC_DAC is zero, then the difference Δd is the absolute flying height of the head.

Figure 5:
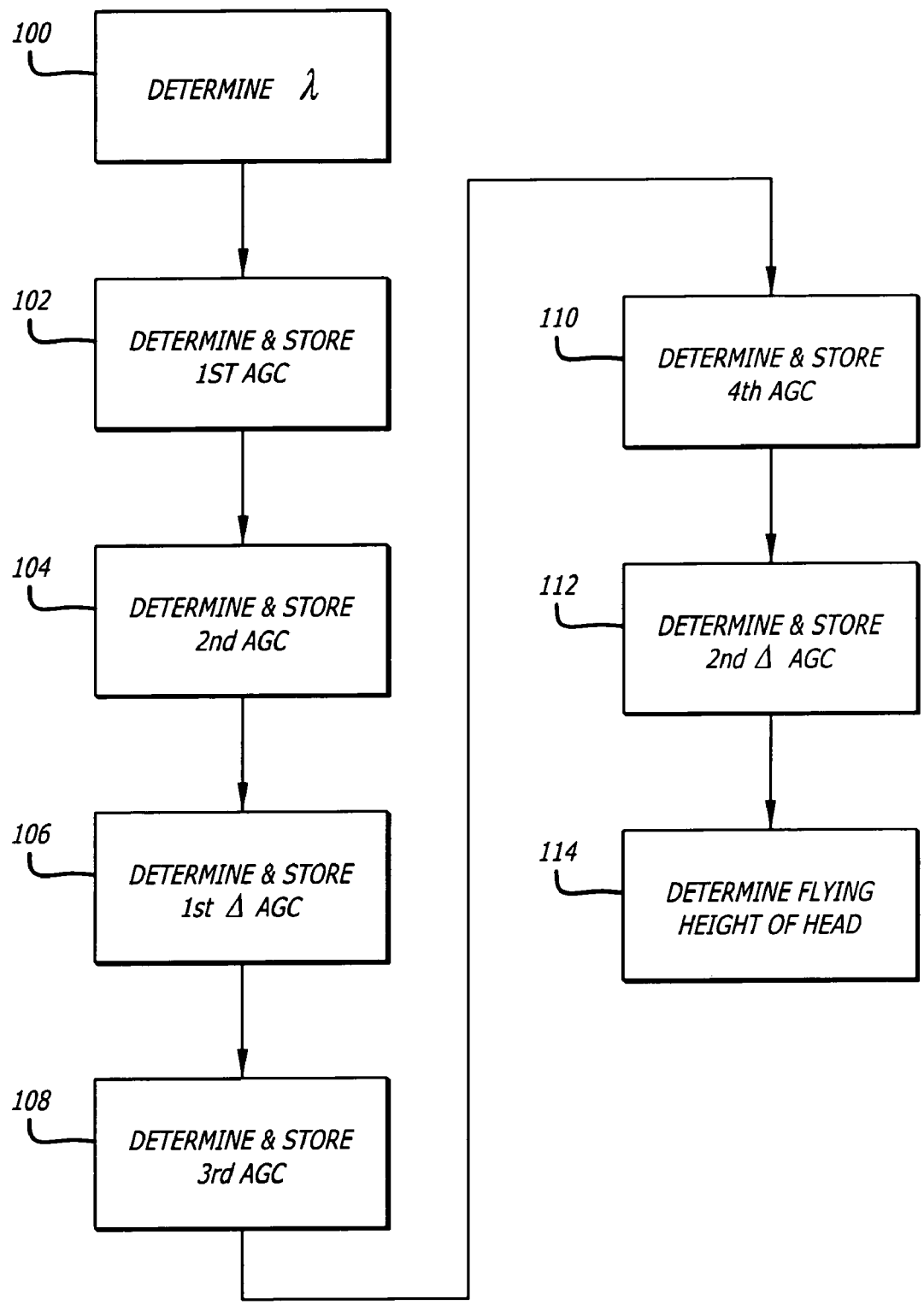
FIG. 5 is a flowchart showing a process for determining a flying height of a hard disk drive head.

FIG. 5 is a flowchart showing a method for determining a flying height. In step 100 the recording wavelength is determined. In step 102 a pre-amplifier gain is set and a first AGC value is determined and stored. In step 104 the pre-amplifier gain is changed and a second AGC value is determined and stored. In step 106 the difference between the first and second AGC values is computed and stored.

λ is determined. In step 102 a pre-amplifier gain is set and a first AGC value is determined and stored. In step 104 the pre-amplifier gain is changed and a second AGC value is determined and stored. In step 106 the difference between the first and second AGC values is computed and stored.

In step 108 the flying height is reduce to zero and a third AGC value is determined and stored. The flying height can be reduced by providing current to the coil of an FOD head. In step 110 the flying height is varied to a non-zero value and a fourth AGC is determined and stored. In step 112, the difference between the third and fourth AGC values is computed and stored. In step 114, the flying height is determined using equation (1).

Figure 6:
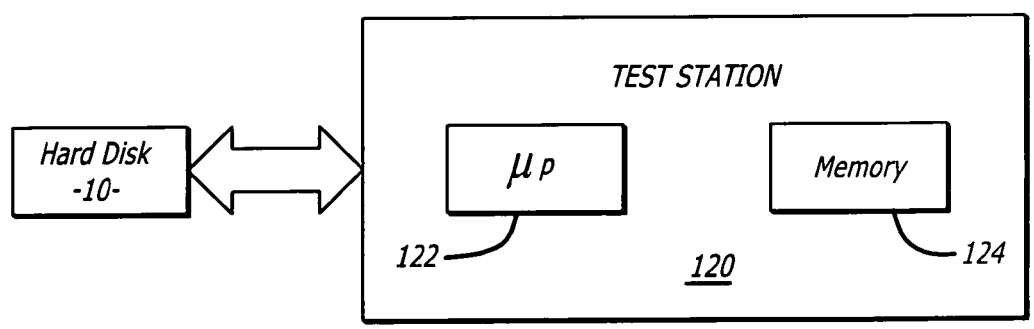
FIG. 6 is a schematic showing a test station connected to a disk drive.

This process may be performed by a test station 120 that is connected to the drive 10 as shown in FIG. 6. The test station 120 may contain a controller 122, memory 124 and other associated circuitry. The controller 122 may perform the test process in accordance with data and operations stored in memory 124. The memory 124 may also store the various data, such as AGC values, recording wavelength, that are used to compute the flying height. The test station 120 can be used to test heads that are assembled into a hard disk drive assembly. The heads can also be tested individually on a separate test station using the process described. The separate test station could be similar to the embodiment shown in FIG. 3, wherein the station includes the components shown except the heads which are loaded and unloaded from the station.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for determining a flying height of a head of a hard disk drive that has a pre-amplifier and an automatic gain control circuit that processes an automatic gain control value, comprising:
    determining a first automatic gain control value at a first pre-amplifier gain setting;
    determining a second automatic gain control value at a second pre-amplifier gain setting;
    determining a first delta automatic gain control value from said first and second automatic control values;
    determining a third automatic gain control value at a first flying height;
    determining a fourth automatic gain control value at a second flying height;
    determining a second delta automatic gain control value from said third and fourth automatic gain control values;
    determining a difference in the first and second flying heights from said first and second delta automatic gain control values.

2. The method of claim 1, wherein the first flying height is zero.

3. The method of claim 1, wherein the first and second flying heights are established by varying a current to a coil of the head.

4. The method of claim 1, further comprising determining a recording wavelength that is used to determine the difference between the first and second flying heights.

5. The method of claim 1, wherein the difference in the first and second flying heights is computed from the following equation:

$$\Delta d = \frac{\lambda}{2\pi} \cdot \ln(\text{cal\_gain\_ratio}) \cdot \left(\frac{\text{Delta\_AGC\_DAC}}{\text{AGC\_CAL}}\right) \quad (1)$$

Where:
λ=the recording wavelength, which can be determined from the rotational speed of the disk and the location of the head on the disk;
AGC_CAL=the difference between two AGC values at different pre-amplifier gain settings;
cal_gain_ratio=the ratio of the different pre-amplifier gain settings;
Delta_AGC_DAC=the difference between two AGC values at different flying heights.

6. A test stand used to determine a flying height of a head of a hard disk drive that has a pre-amplifier and an automatic gain control circuit, comprising:
a spindle motor that rotates a disk;
a head coupled to said disk;
a circuit coupled to said head, said circuit includes a pre-amplifier and an automatic gain control circuit, said circuit further including a controller that performs a process, said process includes:
determining a first automatic gain control value at a first pre-amplifier gain setting;
determining a second automatic gain control value at a second pre-amplifier gain setting;
determining a first delta automatic gain control value from said first and second automatic control values;
determining a third automatic gain control value at a first flying height;
determining a fourth automatic gain control value at a second flying height;
determining a second delta automatic gain control value from said third and fourth automatic gain control values;
determining a difference in the first and second flying heights from said first and second differential automatic gain control values.

7. The test stand of claim 6, wherein the first flying height is zero.

8. The test stand of claim 6, wherein the first and second flying heights are established by varying a current to a coil of the head.

9. The test stand of claim 6, further comprising determining a recording wavelength that is used to determine the difference between the first and second flying heights.

10. The test of claim 6, wherein the difference in the first and second flying heights is computed from the following equation:

$$\Delta d = \frac{\lambda}{2\pi} \cdot \ln(\text{cal\_gain\_ratio}) \cdot \left(\frac{\text{Delta\_AGC\_DAC}}{\text{AGC\_CAL}}\right) \quad (1)$$

Where:
λ=the recording wavelength, which can be determined from the rotational speed of the disk and the location of the head on the disk;
AGC_CAL=the difference between two AGC values at different pre-amplifier gain settings;
cal_gain_ratio=the ratio of the different pre-amplifier gain settings;
Delta_AGC_DAC=the difference between two AGC values at different flying heights.

11. An apparatus that contains a program for determining a flying height of a head of a hard disk drive that has a pre-amplifier and an automatic gain control circuit, comprising:
a program storage medium that contains a program which causes a controller to determine a first automatic gain control value at a first pre-amplifier gain setting, determine a second automatic gain control value at a second pre-amplifier gain setting, determine a first delta automatic gain control value from said first and second automatic control values, determine a third automatic gain control value at a first flying height, determine a fourth automatic gain control value at a second flying height, determine a second delta automatic gain control value from said third and fourth automatic gain control values, determine a difference in the first and second flying heights from said first and second differential automatic gain control values.

12. The apparatus of claim 11, wherein said first flying height is zero.

13. The apparatus of claim 11, wherein the first and second flying heights are established by varying a current to a coil of the head.

14. The apparatus of claim 11, further comprising determining a recording frequency that is used to determine the difference between the first and second flying heights.

15. The apparatus of claim 11, wherein the difference in the first and second flying heights is computed from the following equation:

$$\Delta d = \frac{\lambda}{2\pi} \cdot \ln(\text{cal\_gain\_ratio}) \cdot \left(\frac{\text{Delta\_AGC\_DAC}}{\text{AGC\_CAL}}\right) \quad (1)$$

Where:
λ=the recording wavelength, which can be determined from the rotational speed of the disk and the location of the head on the disk;
AGC_CAL=the difference between two AGC values at different pre-amplifier gain settings;
cal_gain_ratio=the ratio of the different pre-amplifier gain settings;
Delta_AGC_DAC=the difference between two AGC values at different flying heights.

* * * * *